United States Patent
Weaver et al.

(10) Patent No.: US 7,031,700 B1
(45) Date of Patent: Apr. 18, 2006

(54) METHOD AND SYSTEM FOR LOCATION-BASED GROUP CONFERENCE INITIATION

(75) Inventors: Farni Weaver, Spring Hill, KS (US); Piyush Jethwa, Overland Park, KS (US); Jesse Grindeland, Olathe, KS (US); David Welch, Shawnee, KS (US); Wen Xue, Overland Park, KS (US); Mike McMullen, Prairie Village, KS (US); Edward Ross, Overland Park, KS (US)

(73) Assignee: Sprint SPectrum L.P., Overland Park, KS (US)

( * ) Notice: Subject to any disclaimer, the term of this patent is extended or adjusted under 35 U.S.C. 154(b) by 233 days.

(21) Appl. No.: 10/716,845

(22) Filed: Nov. 19, 2003

Related U.S. Application Data

(63) Continuation-in-part of application No. 09/993,007, filed on Nov. 14, 2001.

(51) Int. Cl.
*H04Q 7/20* (2006.01)

(52) U.S. Cl. .................. 455/420; 455/419; 455/418; 455/456.2; 455/456.3

(58) Field of Classification Search .............. 455/520, 455/518, 519, 456.2, 456.3
See application file for complete search history.

(56) References Cited

U.S. PATENT DOCUMENTS

| | | | |
|---|---|---|---|
| 6,881,107 B1 * | 4/2005 | Roycroft | 440/12.5 |
| 2002/0102999 A1 * | 8/2002 | Maggenti et al. | 455/518 |
| 2002/0107008 A1 * | 8/2002 | Hendrey et al. | 455/416 |
| 2002/0115453 A1 * | 8/2002 | Poulin et al. | 455/456 |
| 2002/0160766 A1 * | 10/2002 | Portman et al. | 455/422 |
| 2003/0060214 A1 * | 3/2003 | Hendrey et al. | 455/456 |

OTHER PUBLICATIONS

U.S. Appl. No. 09/993,007 filed Nov. 14, 2001.
Invertix Corporation IM Anywhere Privacy Management System, http://www.invertix.com/products_features_privacy management.html, printed from the World Wide Web on Aug. 14, 2001.

(Continued)

*Primary Examiner*—Danh Cong Le

(57) ABSTRACT

A method and system for location-based group conference initiation is provided. A server will receive a request from a user to initiate a media conference, and the server will then initiate a conference with members of a group who are located in a designated location. The request may indicate a group of users who are candidates to be invited to the conference, and the location at issue. Given the request, the server will determine which of the candidate users are currently located within the zone at issue. And the server will then invite each of those candidate users to participate in the conference.

23 Claims, 4 Drawing Sheets

OTHER PUBLICATIONS

Invertix Corporation IM Anywhere Mobile Buddy List Features, http://www.invertix.com/products_features_mobilebuddylist.html, printed from the World Wide Web on Aug. 14, 2001.

Followap Telecommunications, iFollow Products Family, http://www.followap.com/shtml/follow_main.shtml, printed from the World Wide Web on Aug. 14, 2001.

Wireless Developer Network, Addition of Location Management to Wireless Im Set to Drive GPRS Adoption, http://www.wirelessdevnet.com/news/2001/23/news2.html, printed from the World Wide Web on Aug. 14, 2001.

GartnerGroup, Yahoo!Find-a-Friend: Wireless or Borderless Privacy?, http://gartner11.gartnerweb.com/public/static/hotc/hc00088645.html, printed from the World Wide Web on Sep. 6, 2001.

* cited by examiner

METHOD AND SYSTEM FOR LOCATION-BASED GROUP CONFERENCE INITIATION

CROSS REFERENCE TO RELATED APPLICATION

The present patent application is a continuation-in-part of U.S. patent application Ser. No. 09/993,007, filed on Nov. 14, 2001, the full disclosure of which is incorporated herein by reference.

FIELD OF INVENTION

The present invention relates to mobile communications and, more particularly, to initiating group conferences.

BACKGROUND

Cellular wireless is an increasingly popular means of personal communication in the modem world. People are using cellular wireless networks for the exchange of voice and data with cellular telephones, Personal Digital Assistants (PDAs), cellular telephone modems, and other devices. In principle, a user can seek information over the Internet or call anyone over a Public Switched Telephone Network (PSTN) from any place inside the coverage area of the cellular wireless network.

An important feature of cellular wireless networks is an ability to locate the geographical position of a mobile station. Such a feature was developed initially to assist emergency services in locating a mobile station. For example, in the United States, the Federal Communications Commission (FCC) has mandated the implementation of "Enhanced 911" (E911) services.

The E911 mandate was divided into two phases. According to Phase 1, the location must be identified with an accuracy of at least cell and sector. As this information is typically maintained by a wireless cellular carrier in a subscriber's home location register (HLR), Phase 1 presents little technical challenge. According to Phase 2, the location must be provided with an accuracy of at least 100 meters (or 50 meters for handset-originated methods such as global position satellite (GPS)), which is far more granular than the cell and sector information maintained in the HLR. In response, the Telecommunications Industry Association (TIA) proposed a standard for "Enhanced Wireless 9-1-1, Phase 2," entitled "Wireless Enhanced Emergency Services" or "TL1/EIA/IS-J-STD-036-A" (J-STD-036-A), the entirety of which is hereby incorporated by reference.

In order to achieve the accuracy specified by Phase 2, a cellular wireless network may employ a special position determining entity (PDE) and location determining techniques. Alternatively, a mobile station itself may employ a position determining system such as a GPS system and may relay its position to the network, for reference by the emergency services. The emergency services may then use the position of the mobile station to help assist a user of the mobile station.

Another important feature of cellular wireless networks is an ability to initiate and participate in a real-time media conference with one or more designated target users at other mobile stations. A conference server such as a multipoint control unit (MCU), conference bridge, switch or other entity can reside in the communication network and can function as a bridging or switching device between the participating stations, to support the conference session. The conference server may provide an "instant connect" service, where a user of one mobile station can readily initiate the real-time media conference with other mobile stations.

SUMMARY

The present invention provides a mechanism for location-based group conference initiation. According to an exemplary embodiment of the invention, a wireless carrier or other entity will receive a request to initiate a media session from a user. The request will define a target group that includes members. The carrier or other entity will then select members of the target group that are located in a given zone and will initiate the media session between the user and the selected members.

The zone can be a cell, sector or some other designated location or area such as a building or a sports stadium for instance. Alternatively, the zone can be defined with respect to the requesting user, such as an area covering a predefined distance from the subscriber.

In one embodiment, the carrier may determine a location of the user and establish the given zone based on the location of the user. The carrier may then select members of the target group by determining respective locations of the members of the target group and, based on the respective locations, determining which members of the target group are located within the given zone. For instance, the carrier may determine which members are located within the given zone by determining which of the respective locations are within a predefined distance of the user, or possibly by determining which members of the target group are located within a wireless service area in which the user is also located. Other examples are possible as well.

These as well as other features, advantages and alternatives will become apparent to those of ordinary skill in the art by reading the following detailed description, with appropriate reference to the accompanying drawings.

BRIEF DESCRIPTION OF FIGURES

An exemplary embodiment of the present invention is described herein with reference to the drawings, in which.

DETAILED DESCRIPTION OF EXEMPLARY EMBODIMENTS

The present invention provides a mechanism for initiating a group conference session, such as a "push-to-talk" session for instance. According to an exemplary embodiment of the invention, a server will receive a request from a user (i.e., from the user's mobile station) to initiate a media conference, and the server will then initiate a conference with members of a group who are located in a designated location or "zone."

Preferably, the request will expressly or inherently indicate a group of users who are candidates to be invited to the conference. As an example, the request may expressly list the candidate users. As another example, the request may recite a group number, and the server may correlate that group number with a group of candidate users. And as another example, the request may simply designate the requesting user, and the server may then correlate the requesting user with the group of candidate users.

Also preferably, the request will expressly or inherently indicate the location or "zone" at issue. As an example, the request may expressly recite geographic coordinates (e.g., latitude, longitude, and/or altitude) that define the zone. As another example, the request may recite a single geographic position, and the server may determine that the zone is the area extending out by a predefined radius from that position. And as another example, the request may simply identify the user or requesting device, and the server may determine the position of that user/device (e.g., by querying a position determining system) and may then determine the zone based on that position.

Given the request, the server will determine which of the candidate users are currently located within the zone at issue (e.g., by querying a position determining system). And the server will then invite each of those candidate users to participate in the conference.

I. Overview

Figure 1:
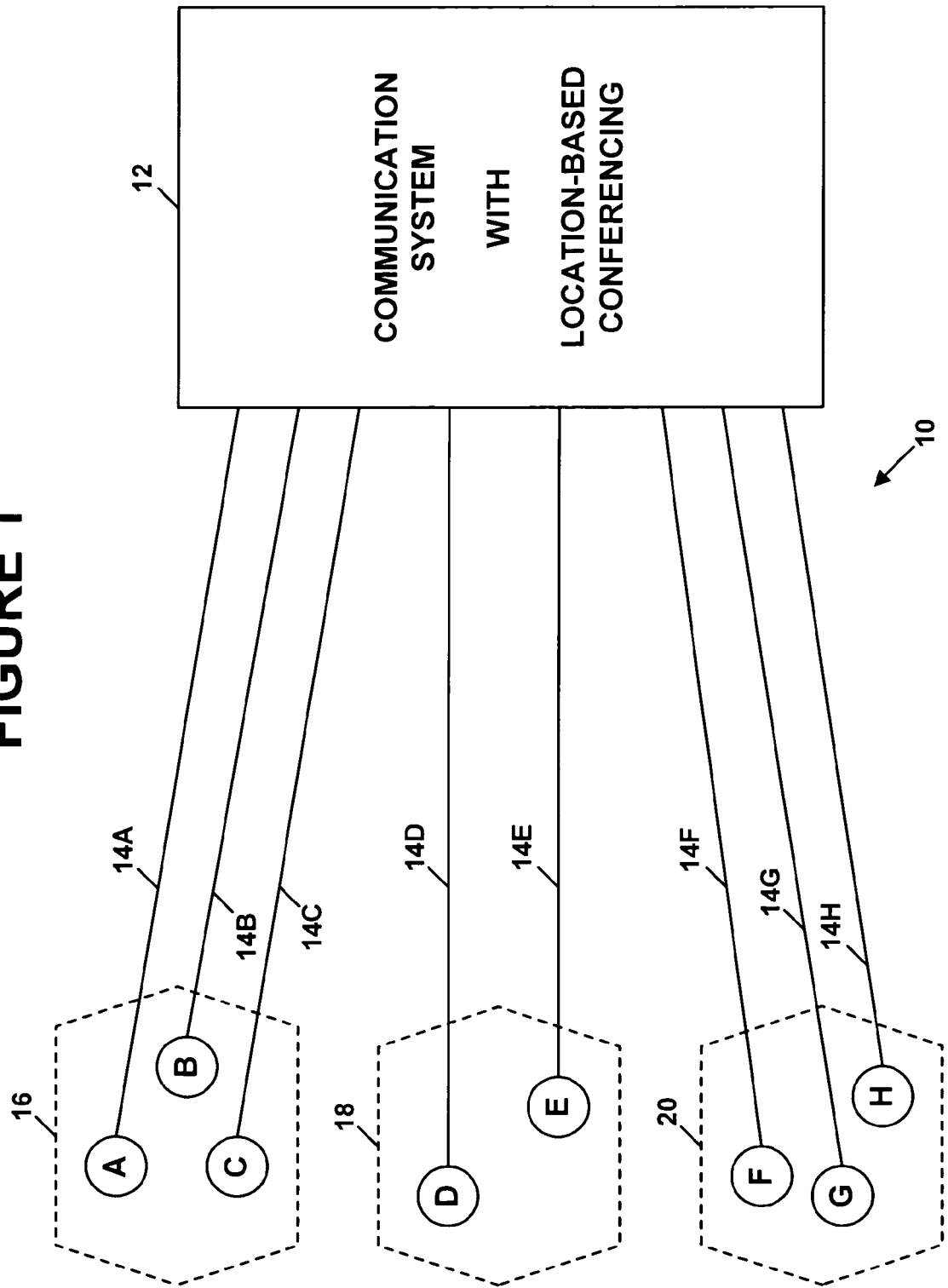
FIG. 1 is a block diagram of a network arranged in accordance with the exemplary embodiment.

Referring to the drawings, FIG. 1 is a block diagram generally depicting a communications network 10 arranged in accordance with an exemplary embodiment of the invention. Network 10 includes at its core a communication system 12, which provides a location-based conferencing system. A plurality of mobile subscriber terminals may then be coupled by respective communication links 14A–14H with system 12. By way of example, eight such terminals are shown, designated respectively by the letters A–H.

FIG. 1 further depicts three geographic zones, designated by reference numerals 16, 18 and 20. Terminals A–C are shown located in (e.g., operating in) zone 16, terminals D–E are shown located in zone 18, and terminals F–H are shown located in zone 20. Although these zones are illustrated as discrete (non-overlapping) areas, they could just as well overlap each other or, for that matter, be coterminous.

Each zone could be defined in various ways. For example, a zone could be a particular geographic area, defined as a polygon comprised of nodes having specific geographic coordinates (latitude/longitude coordinates). As another example, a zone could be a particular enclosure such as a building or floor of a building, defined by the walls of the enclosure. As yet another example, a zone could be a service area in a wireless communication system, such a radio-frequency cell or sector thereof, defined by a radiation pattern from a base station antenna. And as yet another example, as noted above, a zone could be defined as the area extending out a predefined distance from a given subscriber, such as a predefined radius from the given subscriber. Further, a zone could be a specific municipality, town, or city, for example.

Mobile subscriber terminals A–H can also take any of a variety of forms and can be the same as each other or different than each other. Examples of suitable terminals include cellular or PCS telephones, PC cards or data terminals (e.g., wireless web devices such as the RIM Blackberry or the Palm VII personal digital assistant), wireless local area network stations (e.g., stations that are compliant with industry standard 802.11b), and satellite communication terminals. Other examples are possible as well.

Links 14A–14H, similarly, can take any of a variety of forms and can also be the same as or different than each other. Further, each link could comprise various elements, such as wired or wireless connections, direct end-to-end connections, and one or more transport networks, whether packet-switched or circuit-switched, and each link could operate according to any of a variety of protocols. Additionally, some or all of the links could be combined together at least in part. For instance, links 14A and 14B might be physically connected through a common access network/gateway and via a common transport network to communication server 12. Many other examples are also possible.

Communication system 12, in turn, can also take a variety of forms. As a general matter, communication system 12 functions to receive a conference request from a user and to responsively select other users to participate in the conference based on the locations of the other users, and possibly based on the location of the requesting user. Communication system 12 may be directed to determine the users' locations and select those users that are in or near the same zone as the requesting user that initiated the conferencing process, for example. Communication server 12 may also be directed to select users based on which users are located in a given zone as defined by the requesting user. Other examples are possible.

Figure 2:
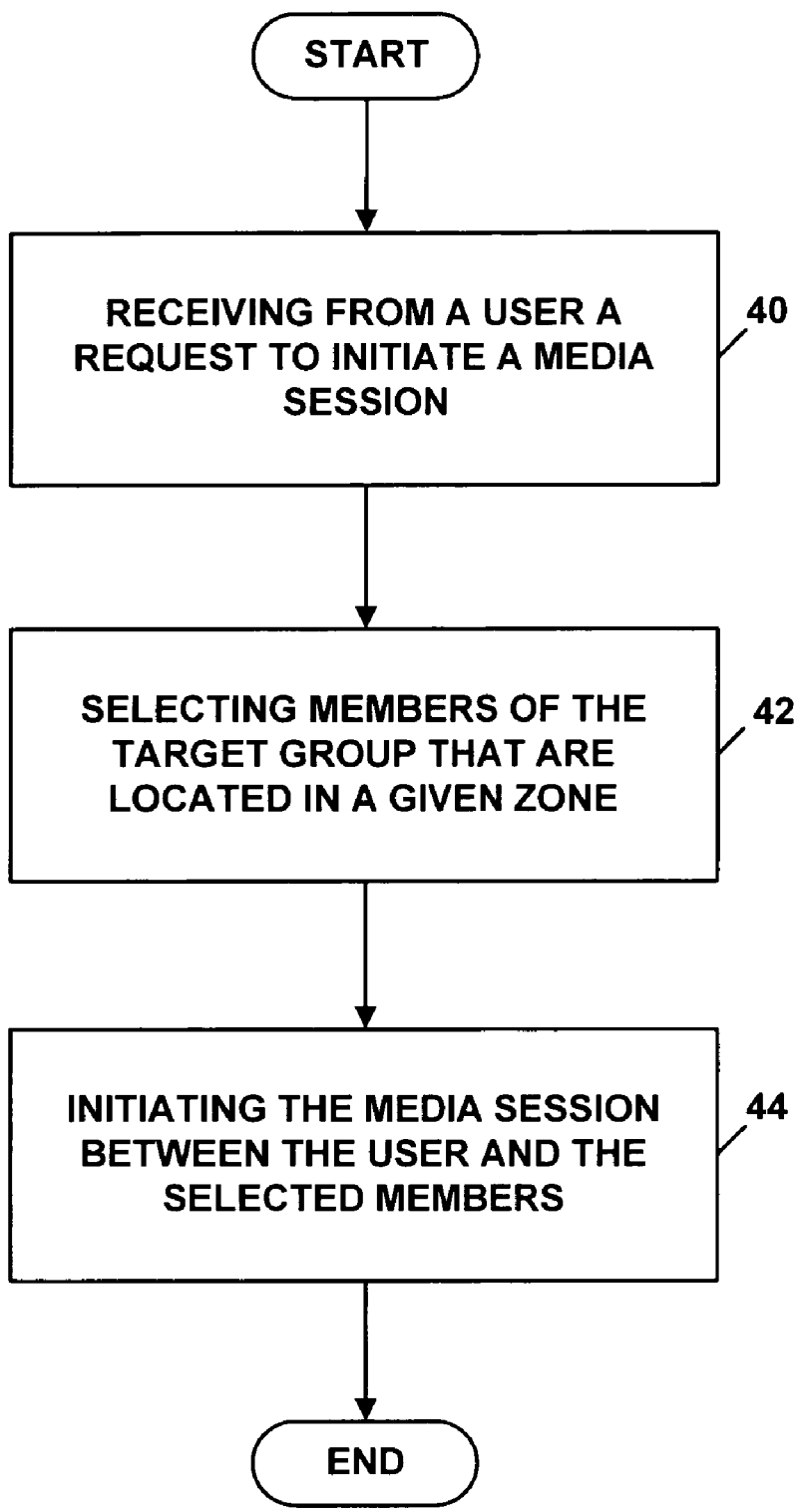
FIG. 2 is a flow chart depicting a set of functions that can be employed in the network shown in FIG. 1.

Referring now to FIG. 2, a flow chart is provided to illustrate a set of functions that could be employed within the arrangement shown in FIG. 1. As shown in FIG. 2, at block 40, communication system 12 receives a request from a user (i.e., from the user's mobile station) to initiate a media session. The request itself might specify mobile subscribers with which the user wishes to communicate in the media session, such as by specifying a target group that includes members. For example, a target group could be a predefined buddy list of the user, or the members of the group could be selected by the user. Alternatively, the communication system 12 may identify the mobile subscribers with which the user wishes to communicate by reference to a predefined grouping associated with the user. For example, the request may include an identifier of the user, and the communication system 12 may then look up the target group based on the identifier of the user.

At block 42, the communication system 12 selects members of the target group that are located in a given zone. For example, the communication system 12 could select members by determining that the user and certain members are located in (e.g., operating in) a common zone (i.e., in the same zone as each other). As such, the communication system 12 could determine a location of the user, and then establish the given zone based on the location of the user. The communication system 12 could then determine respective locations of the members of the target group, and based on the respective locations, determine which members of the target group are located within the given zone. This may be accomplished by determining which of the respective locations are within a predefined distance of the user, or by determining which members of the target group are located within a wireless service area in which the user is also located, for example. As still a further example, the communication system 12 could establish a list of the members of the target group by ranking the members of the target group based on respective distances between their respective locations and the location of the user. The communication system 12 could then select members of the target group that are closest in distance to the user by selecting those that are at the beginning of the list.

As yet another example, the request to initiate the media session may indicate the given zone (e.g., geographic coordinates that define the given zone), and the communication system 12 would then determine the respective locations of the members of the target group and then determine which of those are located in the given zone.

In turn, as shown at block 44, the communication system 12 initiates the media session between the user and the selected members. As noted above, the selected members could be those located in a common zone with the user, and thus the communication system 12 would then initiate a conference call between the user and members that are located nearby, for example. However, as further noted above, the selected members can be determined by any number of ways, and the communication system 12 would then initiate the media session with these members.

The media session may include voice and/or data communications. For example, the media session could be a conference call. The media session could also be a real-time media conference.

Thus, referring to FIG. 1, for instance, the communication system 12 might receive a request from subscriber terminal A to initiate a media session with users listed in a predefined group (e.g., buddy list, personal address book, etc.) associated with subscriber terminal A (or with a user of subscriber terminal A), and that are located in the same zone as terminal A. Suppose terminals B, E, and F are in subscriber A's buddy list. The communication system 12 may then determine the locations of terminals B, E, and F in order to determine if they are located in a given zone, such as the same zone as subscriber terminal A, namely zone 16. Consequently, the communication system 12 will determine that only terminal B is in the same zone as terminal A. Thus, the communication system 12 would initiate a media session between subscriber terminal A and subscriber terminal B.

II. 3G Wireless Architecture

Figure 3:
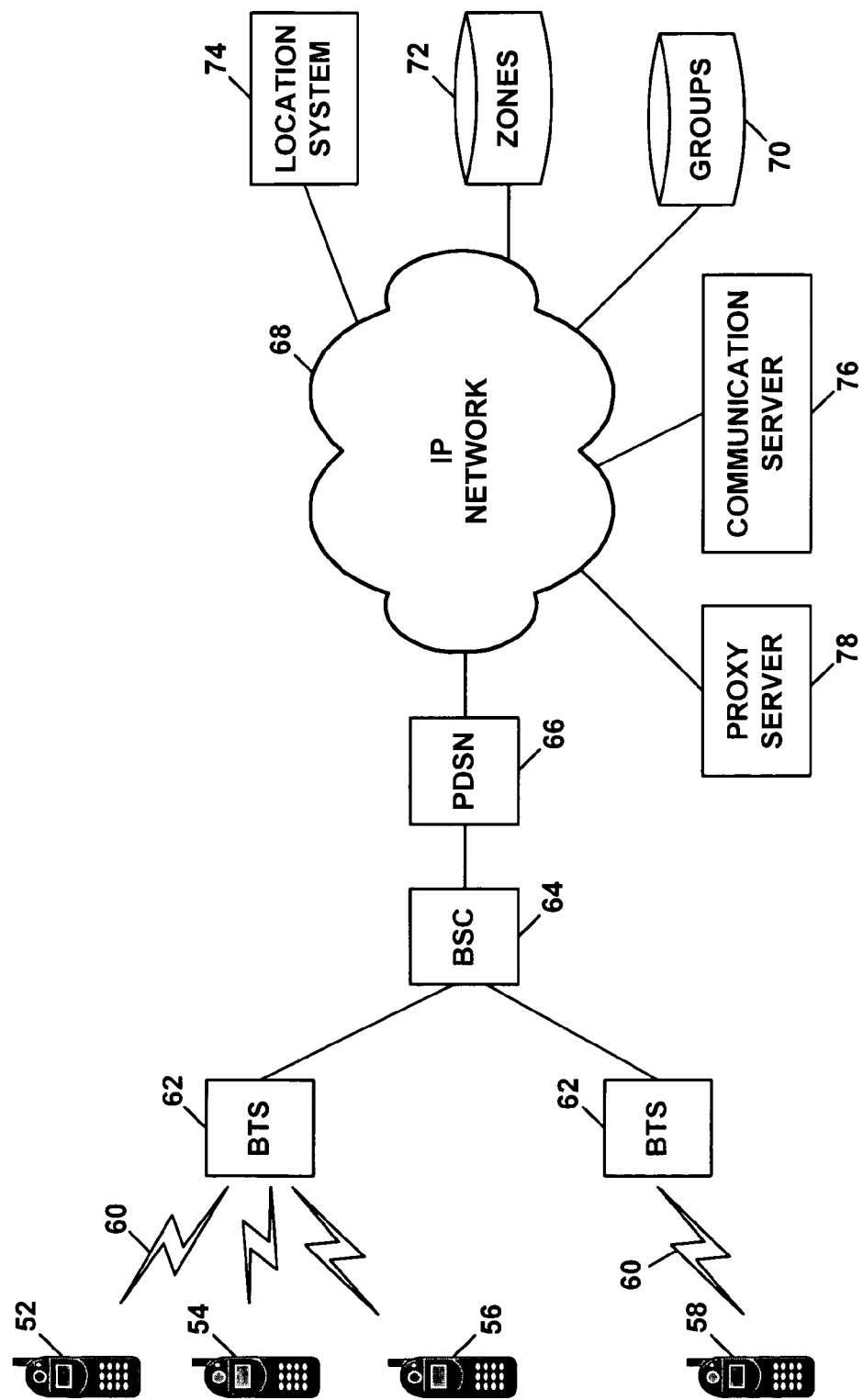
FIG. 3 is a more detailed block diagram of a network arranged in accordance with the exemplary embodiment.

The arrangement shown in FIG. 1 is representative of many possible communication networks in which the exemplary embodiment can be carried out. Referring now to FIG. 3, an example of one such communication network is shown in more detail. The network shown in FIG. 3 is one example of a third-generation (3G) wireless network.

The network includes a plurality of subscriber terminals, of which four are shown, designated by reference numerals 52, 54, 56 and 58. In this example, each subscriber terminal is a 3G mobile station, such as a handheld PCS or cellular communication station, which is capable of engaging in IP communications. Each mobile station communicates via an air interface 60 with a base transceiver station (BTS) 62. The communications between the BTS 62 and each mobile station may occur in a digital format, such as the format described in TIA/EIA/IS-2000 Series, Rev. A (published March 2000), which is fully incorporated herein by reference. The BTS 62 in turn provides connectivity to a base station controller (BSC) 64. The BSC 64 provides connectivity with a packet data serving node (PDSN) 66, which functions as a gateway to a public or private IP network 68 such as the Internet.

The BSC 64 and BTS 62 may connect calls from the IP network 68, which calls may originate from calling parties using landline telephones, mobile stations, or other communication devices, to the terminals 52, 54, 56, and 58. Similarly, the BSC 64 and BTS 62 may connect calls originating from terminals 52, 54, 56, and 58 to their destinations, via the IP network 68.

FIG. 3 depicts a plurality of entities connected with or sitting as nodes on the IP network 68. It should be understood that each of these entities represents a function within the exemplary network. As such, the entities could take various forms and could be combined together or distributed in various ways (e.g., made up of a number of components) as desired. Further, some of the entities could be omitted, and others could be added.

Still further, any of these or other entities that are described herein as carrying out a particular function could include a processor and data storage holding an appropriate set of program instructions (e.g., machine language instructions) executable by the processor to carry out that function. Alternatively or additionally, such entities could include hardware and/or firmware for carrying out various functions described. Still further, it should be understood that some or all of the entities shown on the network 68 could instead be on discrete networks or arranged in other locations.

Two of the entities shown on the IP network 68 are data stores. These are a group data store 70 and a zone data store 72. These data stores could all be combined into a single data store or could be distributed and/or integrated into one or more other entities, whether or not shown. Each data store can also take various forms. For instance, a data store could be a list or table of data or a more complex relational database or directory structure, stored in a data storage medium such as computer memory or magnetic or optical disk drive.

The group data store 70 indicates predefined groups of subscribers, which can be used to identify one or more subscribers with whom a given subscriber wishes to communicate. As such, the group data store 70 might logically tie together a given subscriber's identifier (ID) with one or more other subscriber IDs. That way, a query keyed to the given subscriber's ID could produce a list of the one or more other subscriber IDs in the given subscriber's group.

The subscriber ID can take various forms. For instance, it could be a device ID such as a mobile identification number (MIN) or an encrypted MIN (EMIN) and/or a user ID such as a network access identifier (NAI) or buddy name (as an alias for an ID). If the subscriber ID provides a user ID, the group data store 70 may also include a password, for use in authenticating the subscriber if desired.

The groups defined by the group data store 70 might be provisioned in advance specifically to facilitate operation of the exemplary embodiment. Alternatively, the groups may already exist for some other reason. For example, some or all of the groups can be "buddy lists," of the type commonly maintained to facilitate instant messaging and other such communications. A web-based provisioning interface can be provided, to enable users to provision their group lists if desired.

For example, the group data store 70 may indicate that the group of subscribers associated with mobile station 52 comprises mobile stations 54, 56 and 58. Alternatively, the group data store 70 might indicate that the group of subscribers associated of mobile station 52 comprises users of mobile stations 54, 56 and 58. Other examples are also possible.

The zone data store 72 defines zones, such as zones 16, 18 and 20 of FIG. 1. Because a zone can be defined in various ways, the information contained in the zone data store 72, may take various forms as well. As an example, if zones are defined as cells or sectors of a wireless communication system, the zone data store 72 might list the available cells and sectors. And as another example, if zones are defined as geographic locations (e.g., bounded by particular geographic coordinates), the zone data store 72 might correlate particular geographic coordinates to a given zone.

III. Location Determination

Another entity on network 68 is a location system 74. In the exemplary embodiment, the location system 74 functions to determine and/or report the location of subscriber terminals, such as mobile stations 52–58. As such, the location system 74 could take a variety of forms. For example, the location system 74 could comprise a mobile positioning center (MPC) and a position determining entity (PDE) as defined by J-STD-036-A, the entirety of which is hereby incorporated by reference.

The MPC can generally be a database application executed on a service control point and can function to store locations of a mobile station. The PDE, in turn, can be any system for determining the location of mobile stations. As an example, the PDE might be a network-based location-determination system, such as an HLR that maintains a record of the cell and sector in which each mobile station is currently operating, or a triangularization system that determines where a mobile station is located based on a comparison of relative signal strength from several measuring points. Alternatively or additionally, the PDE might be a handset-based (or, more generally, subscriber based) position determining system, such as a GPS receiver in a mobile station. In that event, a mechanism would preferably be provided to facilitate communication of location information between the handset and other network entities. Such a mechanism is defined by industry standard TIA/EIA/IS-801, the entirety of which is hereby incorporated by reference.

In the exemplary embodiment, the MPC would then collect the location of each subscriber terminal, as determined by the PDE. In turn, one or more other entities on the network 68 could query the MPC to determine the location of a given subscriber terminal, and the MPC can report the requested location. In the exemplary embodiment, the location reported by the MPC could be an indication of which zone the subscriber terminal is located in at the moment (or, equivalently, as last determined). In this regard, the location itself might be the zone (such as if the location is a cell and/or sector for instance). Or the MPC or other entity (e.g., the querying entity) could translate the location information into a zone.

Alternatively, an entity on network 68 could query the MPC, an HLR, or a VLR (visitor location register) to obtain a list of all subscriber terminals that are located in a given zone (such as all subscriber terminals in a particular cell sector). The entity can then query that list to determine if a given subscriber terminal is located in that zone.

IV. Conference Initiation

Still another entity on IP network 68 is a communication server 76, which, in this example, provides the core intelligence of communication system 12. In particular, the communication server 76 allows users to establish real-time media conferences over a packet-switched network (e.g., IP network 68) with multiple user stations, each operated by a respective user. The communication server 76, such as a multipoint conference unit (MCU) for instance, can reside functionally in the network and can operate as a bridging or switching device between the participating stations, to support a conference session.

In practice, a participating station might initiate a conference session by sending to the communication server 76 a session setup message that identifies the other desired participant(s). The communication server 76 may then seek to connect each of the designated other participants, such as by forwarding the session setup message or sending a new session setup message to each other party. Ultimately, the server 76 would thereby establish a conference leg with each participating station, including the initiating station, and the server 76 would then bridge together the legs so that the users at the stations can confer with each other, exchanging voice, video and/or other media in real-time via the server 76.

A signaling mechanism such as the well known Session Initiation Protocol (SIP) could be used to initialize the conference and more particularly to set up each conference leg. Further, digitized media could be packetized and carried between each participating station according to a mechanism such as the well-known Real-time Transport Protocol (RTP), for instance. The core industry standards for SIP (Internet Engineering Task Force (IETF) Request For Comments (RFC) 2543 and RFC 3261) and RTP (IETF RFC 1889) are both hereby incorporated by reference.

Communication server 76 is equipped with hardware and logic (e.g., a processor, data storage and machine language instructions stored in the data storage) to be able to set up media communications with each station and to bridge those communications together so as to allow users at the stations to communicate with each other. As such, communication server 76 may be programmed to engage in signaling communications according to SIP or another designated protocol, in order to set up a conference leg with each participating station. And communication server 76 may further be programmed to receive and send media streams according to RTP or another designated protocol. Communication server 76 can be a discrete entity, such as an MCU. Alternatively, communication server 76 can comprise a number of components, such as (i) a SIP user agent application to set up communication sessions, (ii) an RTP application to facilitate sending and receiving of real-time media, and (iii) bridging logic to bridge together sessions between multiple users so that the users can communicate with each other. Other arrangements are possible as well.

Communication server 76 may use packet based media conferencing to provide an "instant connect" service, where a user of one mobile station can readily initiate a real-time media conference with one or more designated target users at other stations. The initiating user may simply select a target user or group and then press an instant connect button on his or her station, and the user's station would responsively signal to the communication server 76 and cause the server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of mobile stations of a conference are likely to be wireless devices such as cellular mobile stations, which are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate a PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server 76, to set up a conference session in the manner described above for instance, and the user could begin talking with the other users. Further, a similar mechanism could be applied to establish real-time media conferences carrying video or other media as well.

As a more particular example, a user of mobile station 52 may instruct mobile station 52 to initiate a conference, and the mobile station 52 may responsively execute SIP user agent logic to generate and send a SIP INVITE message to the communication server 76, seeking to invite a user of mobile station 58 to the conference session. Conventionally, the SIP INVITE may carry a session description protocol (SDP) block that indicates the mobile station's capabilities and the desired session type (e.g., RTP/VoIP).

The communication server 76 may then treat the INVITE message as a request to establish a session between mobile stations 52 and 58. And to establish that session, the communication server 76 may send another INVITE to mobile station 58, seeking to set up a session with that user, and including an SDP block that indicates the communication server's capabilities and the desired session type. Communication server 76 may contact a proxy server 78 to forward or direct signaling messages from point to point through the network. For instance, if SIP signaling is used, the proxy server 78 could be a SIP proxy server.

Upon receipt of the INVITE from the communication server 76, the mobile station 58 may itself execute SIP user agent logic to accept the invitation, by sending a SIP 200OK message back to the communication server 76 (providing an SDP block that initiates the mobile station's capabilities). Upon receipt of the 200 OK, the communication server 76 may then send a 200 OK to the mobile station 52 (including an SDP that indicates the communication server's capabilities). In turn, the mobile station 52 may send a SIP ACK (acknowledgment) to the communication server 76, and the communication server 76 would send an ACK to the mobile station 58. As a result, two communication sessions or legs will have been initiated, one between the mobile station 52 and the communication server 76, and another between the communication server 76 and the mobile station 58.

Once these legs have been established, the two mobile stations may then begin communicating with the communication sever 76 via respective RTP sessions. And the communication server 76 may bridge together the two sessions, thereby allowing the users of mobile stations 52 and 58 to speak with each other. Further, the industry standard real-time control protocol (RTCP) could be used to manage each session and to tear down the sessions when they are finished. Alternatively, SIP can be used to tear down the sessions.

V. Example Operation

Figure 4:
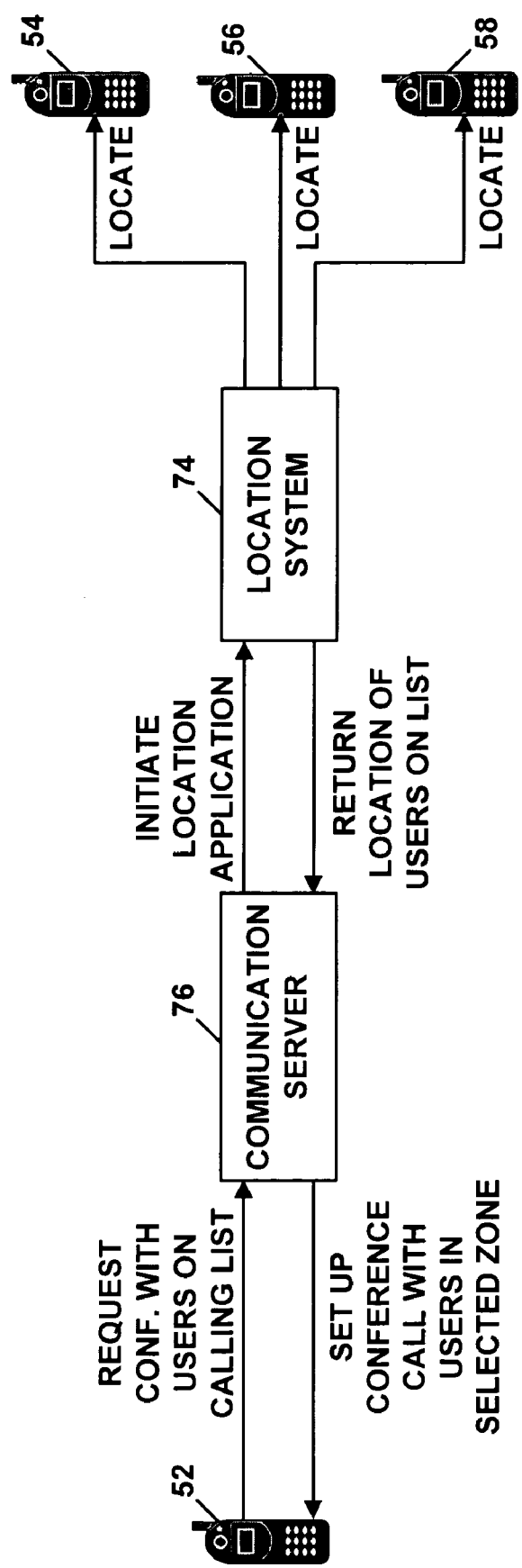
FIG. 4 is block diagram of a portion of the network in FIG. 3 that illustrates one example of signaling within the network to establish a location-based group conference.

FIG. 4 is block diagram of a portion of the network in FIG. 3 that illustrates one example of signaling within the network to establish a location-based group conference. The signaling mechanism illustrated in FIG. 3 is SIP. However, other protocols could be used as well.

A. Receiving a Request to Initiate a Media Session

According to the exemplary embodiment, the user of mobile station 52 may instruct the mobile station 52 to initiate a conference, and the mobile station 52 may responsively execute SIP user agent logic to generate and send a SIP INVITE message to the communication server 76, seeking to invite to the conference session users of a target group that are located in a given zone (e.g., near the user). The SIP INVITE message may specify the target group and the given zone.

The communication server 76 may include SIP user agent logic in order to receive the SIP INVITE request message and process it accordingly. The communication server 76 may treat the INVITE message as a request to establish a conference session between mobile station 52 and mobile stations 54, 56, and 58, which are located in the given zone.

B. Identifying the Zone at Issue

Upon receipt of the SIP INVITE message, the communication server 76 may thus identify the zone at issue. To do so, the communication server 76 may programmatically query the zone data store 72 to determine a zone associated with the requesting subscriber (e.g., user of mobile station 52) such as a zone that is defined by an area extending out a predefined distance from the location of the mobile station 52. The SIP INVITE message may contain a user identifier, and the communication server 76 may query the zone data store 72 to determine the given zone, which may be preset in the zone data store 72.

As another example, the SIP INVITE message may expressly specify the zone and the communication server 76 can thus read the message to determine the zone at issue. As still another example, the SIP INVITE message may indicate that the zone is defined by the cellular coverage area in which the mobile station 52 is currently operating. As such, the communication system 12 could determine a location of the mobile station 52 by querying the location system 74, and then establish the zone based on this location. Other examples as described above are possible as well.

C. Identifying the Target Group

Further, upon receipt of the SIP INVITE message, the communication server 76 may thus identify one or more users to invite to the conference call. To do so, communication server 76 may programmatically query the group data store 70 to find all subscribers associated with the requesting subscriber (e.g., all subscribers in the target group), such as all subscriber's on the requesting subscriber's buddy list for instance. For example, the communication server 76 may contact the group store 70 to identify the users associated with the user of mobile station 52. In this example, the group store 70 may indicate that the users are the users of mobile stations 54, 56, and 58.

Alternatively, the SIP INVITE request message may expressly specify the users with which the user of mobile station 52 desires to invite to the conference call. The communication server 76 may then read the SIP INVITE request to identify the target group. The communication server 76 will then initiate a location application with the location system 74 to locate each of users of the target group, e.g., users of mobile stations 52, 54, and 56.

D. Selecting Member(S) of the Target Group Located in the Zone at Issue

According to the exemplary embodiment, communication server 76 then includes program logic to determine, with respect to each user in the target group, whether the user is in the given zone, such as located nearby (e.g., within 5 miles) the requesting user. To do so, with respect to the requesting user and with respect to each user in target the group, communication server 76 queries the location system 74 to identify the requesting user and the target users' current (or last known) location. In turn, the location system 74 will locate each of the mobile stations 52, 54, 56, and 58 using any of the techniques described in J-STD-036-A. The location system 74 will then return the location of each of the mobile stations 52, 54, 56, and 58 to the communication server 76. To the extent the location information provided by location system 74 does not indicate a zone, communication server 76 may then query the zone data store 72 to determine which zone encompasses the location (e.g., if zones are defined as geographic locations, the zone data store 72 might correlate particular geographic coordinates with a given zone). For each user requested to be included in the conference, communication server 76 then determines if the zone of those users matches the zone of the requesting user (i.e., the user that initiated the conference), or is within a zone that is near the requesting user, for example.

Alternatively, if the zone is defined (either by the requesting user or by default) with respect to the requesting user, such as an area covering a predefined distance from the requesting user, the communication server 76 can determine if the receiving users fall within that predefined distance. For instance, communication server 76 can compute the Euclidian distance between the location coordinates of the requesting user and the location coordinates of receiving users. If the distance is less than or equal to a predefined threshold distance, communication server 76 can conclude that receiving users are in the same zone as the requesting user. Note that this process may work best if the locations of the requesting user and receiving users are known with sufficient granularity, such as with specific latitude/longitude location coordinates.

In this example, suppose the zone of the user of mobile station 58 matches the zone at issue. Thus, the communication server 76 can then select the mobile station 58 that is within the zone at issue in order to initiate the conference call with the mobile station 58.

E. Setting Up the Media Session Between the Requestor and the Selected Target Member(s)

Thus, after the communication server 76 selects the mobile stations that are located in the given zone, the communication server 76 then initiates the conference call between the mobile station 52 and the selected mobile stations (e.g., the mobile station 58). For example, the communication server 76 may send an SIP INVITE message to the mobile station 58 seeking to set up a session with that user. Communication server 76 may contact a proxy server 78 to forward or direct signaling messages from point to point through the network. Upon receipt of the INVITE, the mobile station 58 may execute SIP user agent logic to accept the invitation, by sending a SIP 2000K message to the communication server 76. Upon receipt of the 200 OK, the communication server 76 may then send a 200 OK to the mobile station 52. In turn, the mobile station 52 may send a SIP ACK to the communication server 76, and the communication server 76 would send an ACK to the mobile station 58. As a result, two communication sessions or legs will have been initiated, one between the mobile station 52 and the communication server 76, and another between the communication server 76 and the mobile station 58.

Once these legs have been established, the two mobile stations may then begin communicating with the communication sever 76 via respective RTP sessions. And the communication server 76 may bridge together the two sessions, thereby allowing the users of mobile stations 52 and 58 to speak with each other.

VI. Additional Examples

By adding location technology to conference call sessions, a user may limit who is invited to join the conference based on locations of users, such as by limiting based on a proximity to the requesting user.

As a specific example, on a construction site, a supervisor could select an "all employee" list as the target group and "the job site" as the given zone (e.g., by indicating geographical coordinates of the job site) to only contact employees on the job site. More specifically, a general supervisor of a large construction project could select a PTT "buddy" list of workers assigned to his project as the target group and select an area within a mile of his location as the given zone. (In order to select a target group and/or select a given zone, the supervisor's mobile station may be equipped with a location-based application that may receive inputs from the supervisor.) Now the supervisor (who is on the job site) can use the PTT feature to only contact his workers on the job site and not interfere with workers who are not. The supervisor may then select all areas excluding the job site (such as an area defined by more than a mile from him) as the given zone and the employee list as the target group to contact the workers who should be on the job but are not. The communication server 76 could receive the locations of the workers and the supervisor and then compute the distance between each worker and the supervisor in order to determine which workers are within or not within a mile from the supervisor, for example.

As another example, a general supervisor of a large construction project may not be able to be at the job site. The supervisor could select a PTT "buddy" list of workers assigned to his project as the target group and select a <book-marked location> (e.g., a book-marked location stored on the supervisor's mobile station) as the given zone. Now the supervisor (who is off the job site) can use the PTT feature to only contact his workers on the job site and not interfere with workers who are not.

As still another example, a lead plumber of a plumbing company with multiple trucks operating in the city may need assistance installing a very large pipe. The plumber could select a PTT "buddy" list of workers as the target group and select a "closest person" option as the given zone. Now the plumber could use the push-to-talk feature to only contact the closest co-worker and request assistance. The communication server 76 could receive the locations of all the workers and the lead plumber, and then compute the distance between each worker and the plumber in order to determine which worker is closest to the plumber. The communication server 76 could then initiate a media session with the closest worker.

As yet another example, a supervisor (who is on the job site) of a tower erection company could select a PTT "buddy" list of workers assigned to his project as the target group and select the target zone to be an area more than 100 feet above him and an area within a mile of him. Now the supervisor could use the PTT feature to only contact the supervisor's workers working on the tower and not interfere with workers who are not. The supervisor may then select the workers as the target group and an area less than 100 feet above him and an area within a mile of him as the given zone to contact the workers who are on the job site but not on the tower.

According to the exemplary embodiment, a user may establish a media session using any number of target zones, some of which are described above within the examples. Exemplary target zones include (i) contacting the closest or farthest person from a user, (ii) contacting the X closest or farthest persons to a user, (iii) contacting all persons within or outside a specified radius of a user, (iv) contacting the person the furthest above or below a user, (v) contacting all persons greater than or less than a specified distance above or below a user, (vi) contacting all persons above or below a specified altitude and within or outside a specified radius of a point defined by a user, and (vii) contacting all persons "near" a user (this would require only cell/sector location technology as opposed to a precise location). Any combination of these options and/or other options are possible as well.

While exemplary embodiments have been described, persons of skill in the art will appreciate that variations may be made without departure from the scope and spirit of the invention. This true scope and spirit is defined by the appended claims, which may be interpreted in light of the foregoing.

The invention claimed is:

1. A method for location-based conferencing comprising:
   receiving from a user a request to initiate a media session, wherein the request defines a target group having members;
   selecting members of the target group that are located in a given zone by:
      determining respective locations of the members of the target group:
      based on the respective locations, determining which members of the target group, are located within the given zone;
      based on the respective locations, establishing a list of the members of the target group that are located within the given zone by determining a location of the user and ranking the members of the target group in the list based on respective distances between the respective locations and the location of the user;
      selecting members of the target group that are at a beginning of the list; and
   initiating the media session between the user and the selected members.

2. The method of claim 1, wherein the request identifies the user, and wherein the method further comprises:
   determining the location of the user; and
   establishing the given zone based on the location of the user.

3. The method of claim 1, wherein the given zone is an area extending a predefined distance from the user.

4. The method of claim 1, wherein the given zone is an area extending a predefined distance above or below the user.

5. The method of claim 1, wherein the request includes information indicative of the given zone.

6. The method of claim 5, wherein the information indicative of the given zone comprises geographic coordinates that define the given zone.

7. The method of claim 6, wherein the given zone comprises an area extending out by a predefined radius from the geographic coordinates.

8. The method of claim 1, wherein the media session is a push-to-talk media session.

9. The method of claim 1, wherein the media session is a real-time media conference.

10. The method of claim 1, wherein the target group is defined by a buddy list established by the user.

11. The method of claim 1, wherein the request defines the target group at least in part by defining an identifier of the user, and wherein the method further comprises; looking up the target group based on the identifier of the user.

12. The method of claim 1, wherein the given zone is selected from the group consisting of a municipality and a cellular coverage area.

13. The method of claim 1, wherein based on the respective locations, determining which members of the target group are location within the given zone comprises:
   determining which of the respective locations are within a predefined distance of the user.

14. The method of claim 1, wherein based on the respective locations, determining which members of the target group are located within the given zone comprises:
   determining which members of the target group are located within a wireless service area in which the user is also located.

15. The method of claim 1, further comprising initiating a conference call.

16. The method of claim 1, further comprising participating in a conference call with the selected members.

17. The method of claim 1, further comprising selecting the given zone.

18. The method of claim 1, further comprising:
   selecting a given area; and
   establishing the given zone to be all areas excluding the given area.

19. The method of claim 1, wherein receiving from the user the request comprises receiving via a communication path comprising an air interface.

20. The method of claim 1, wherein receiving from the user the request comprises receiving the request from a client station.

21. A system comprising:
   a processor;
   data storage; and
   machine language instructions stored in the data storage and executable by the processor, in response to a request from a user to initiate a media session with a target group, to:
      (a) select members of the target group that are located in a given zone by (i) determining respective locations of the members of the target group, (ii) based on the respective locations, determining which members of the target group are located within the given zone, (iii) based on the respective locations establishing a list of the members of the target group that are located within the given zone by determining a location of the user and ranking the members of the target group in the list based on respective distances between the respective locations and the location of the user, and (iv) selecting members of the target group that are at a beginning of the list; and
      (b) initiate the media session between the user and the selected members.

22. The system of claim 21, wherein the request identifies the user, and wherein the machine language instructions are further executable by the processor to:
   determine the location of the user; and
   establish the given zone based on the location of the user.

23. A system comprising:
   means for receiving from a user a request to initiate a media session, wherein the request defines a target group having members;
   means for selecting members of the target group that are located in a given zone by:
      determining respective locations of the members of the target group;
      based on the respective locations, determining which members of the target group are located within the given zone;
      based on the respective locations, establishing a list of the members of the target group that are located within the given zone by determining a location of the user and ranking the members of the target group in the list based on respective distances between the respective locations and the location of the user;
      selecting members of the target group that are at a beginning of the list; and
   means for initiating the media session between the user and the selected members.

* * * * *